(12) United States Patent
Sakuma et al.

(10) Patent No.: US 9,016,057 B2
(45) Date of Patent: Apr. 28, 2015

(54) ACTUATOR

(75) Inventors: Atsushi Sakuma, Fuchu (JP); Sayo Kusumi, Fuchu (JP)

(73) Assignee: Tokyo University of Agricultural and Technology, Fuchu-Shi (JP)

( * ) Notice: Subject to any disclaimer, the term of this patent is extended or adjusted under 35 U.S.C. 154(b) by 285 days.

(21) Appl. No.: 13/698,621

(22) PCT Filed: May 2, 2011

(86) PCT No.: PCT/JP2011/060524
§ 371 (c)(1),
(2), (4) Date: Nov. 16, 2012

(87) PCT Pub. No.: WO2011/145457
PCT Pub. Date: Nov. 24, 2011

(65) Prior Publication Data
US 2013/0055708 A1    Mar. 7, 2013

(30) Foreign Application Priority Data
May 17, 2010  (JP) .................................. 2010-113734

(51) Int. Cl.
*F01B 29/10* (2006.01)
*F03G 7/06* (2006.01)

(52) U.S. Cl.
CPC ........................................ *F03G 7/06* (2013.01)

(58) Field of Classification Search
CPC .......................................................... F03G 7/06
USPC .............................. 60/527–529; 310/306–307
See application file for complete search history.

(56) References Cited

U.S. PATENT DOCUMENTS

| 8,109,087 | B2 * | 2/2012 | Usoro et al. ..................... 60/528 |
| 8,436,571 | B2 * | 5/2013 | Hao et al. ...................... 318/631 |
| 8,741,076 | B2 * | 6/2014 | Gao et al. ...................... 148/402 |

FOREIGN PATENT DOCUMENTS

| JP | 59-083203 A | 5/1984 |
| JP | 61-190178 A | 8/1986 |
| JP | 64-068230 A | 3/1989 |
| JP | 06-138264 A | 5/1994 |
| JP | 10-047229 A | 2/1998 |
| JP | 2001-165036 A | 6/2001 |
| JP | 3755032 B2 | 3/2006 |

* cited by examiner

*Primary Examiner* — Hoang Nguyen
(74) *Attorney, Agent, or Firm* — Masuvalley and Partners

(57) ABSTRACT

An actuator using a superelastic material characterized by a low heating temperature, excellent durability, and no necessity of composition adjustment is provided.
An actuator (1) according to the invention includes a movable member operable in two directions, one direction and the other direction, and a pair of wire-like members made of a superelastic alloy and so attached to the movable member that the pair of wire-like members extend in the two respective directions and the same tensile force is applied thereto. The movable member is moved from a neutral position and left stationary in a predetermined position located along the one direction by applying a load to the movable member in the one direction and then removing the load, and the movable member is moved back from the predetermined position located along the one direction to the neutral position by applying a load to the movable member in the other direction and then removing the load.

12 Claims, 11 Drawing Sheets

(A) Initial (B) Loaded (C) Unloaded

ACTUATOR

This application is a national phase application under U.S.C. §371 of International Application Serial No. PCT/JP2011/060524, filed on May 2, 2011, and claims the priority under 35 U.S.C. §119 to Japan Patent Application No. 2010-113734, filed on May 17, 2010, which are hereby expressly incorporated by reference in their entirety for all purposes.

TECHNICAL FIELD

The present invention relates to an actuator using a superelastic material.

BACKGROUND ART

Active deformation of materials that is usable as actuators having a variety of mechanisms has been applied to a number of applications and used in a number of actual products based particularly on shape memory alloys. The shape memory effect, for example, of a Ti—Ni-based alloy having been widely used in the applications and products excels in the performance of removing residual deformation resulting from an applied load and restoring the initial shape when the alloy is heated. On the other hand, two-way shape memory in which active deformation occurs in two ways has also been studied with the intention of widening the range of shape memory application. For example, Patent Literature 1 discloses a method for manufacturing a Ti—Ni-based shape memory alloy wire showing a two-way shape memory effect. That is, a shape memory effect used in a portion where two-way shape memory is required is achieved by deforming a Ti—Ni-based shape memory alloy wire in a controlled cold drawing process to a point where the amount of deformation exceeds the amount of strain restorable in the shape memory effect. Specifically, in the method for manufacturing a Ti—Ni-based shape memory alloy wire through a series of processes of melting/casting, hot working, swaging, process annealing, and cold working, the amount of final cold working (amount of working after last process annealing) is set at a predetermined proportion (%) and then the resultant wire undergoes a heat treatment for a short period at a temperature greater than or equal to a reverse transformation completion temperature.

CITATION LIST

Patent Literature

PTL 1: Japanese Patent No. 3,755,032

SUMMARY OF INVENTION

Technical Problem

When the Ti—Ni-based shape memory alloy wire of the related art described above is used in an actuator, there are problems of a high heating temperature and poor durability. Another problem with achieving a two-way shape memory effect is that the method for manufacturing a Ti—Ni-based alloy or any other similar alloy and adjustment of the composition thereof are complicated. On the other hand, a superelastic alloy, which is thermally and mechanically different from a similar type of shape memory alloy and has a higher transformation temperature and transformation stress, is characterized in that deformation resulting from an applied load is removed and the initial shape is restored when the load is removed. The characteristics along with stable properties and excellent fatigue life allow superelastic alloys to find a greater number of industrial applications than shape memory alloys. No thermal, mechanical evaluation on active deformation of superelastic alloys in terms of the above characteristics thereof has, however, been conducted unlike shape memory alloys, which are similar to superelastic alloys. Further, no study on use of a superelastic alloy as a material of an actuator has been conducted.

The invention has been made in view of the situations described above. An object of the invention is to provide an actuator using a superelastic material characterized by a low heating temperature, excellent durability, and no necessity of composition adjustment.

Solution to Problem

To achieve the object described above, an actuator according to the invention includes a movable member operable in two directions, one direction and the other direction, and a pair of wire-like members made of a superelastic alloy and so attached to the movable member that the pair of wire-like members extend in the two respective directions and the same tensile force is applied thereto. The actuator is characterized in that the movable member is moved from a neutral position and left stationary in a predetermined position located along the one direction by applying a load to the movable member in the one direction and then removing the load, and the movable member is moved back from the predetermined position located along the one direction to the neutral position by applying a load to the movable member in the other direction and then removing the load.

The actuator described above may further be characterized in that the movable member is moved from the neutral position and left stationary in the predetermined position located along the one direction by heating the wire-like member extending in the one direction and then cooling the wire-like member, and the movable member is moved back from the predetermined position located along the one direction to the neutral position by heating the wire-like member extending in the other direction and then cooling the wire-like member.

Advantageous Effects of Inventions

The invention can provide an actuator using a superelastic material characterized by a low heating temperature, excellent durability, and no necessity of composition adjustment.

DESCRIPTION OF EMBODIMENTS

An embodiment of the invention will be described with reference to the drawings. It is noted that the embodiment described below does not limit the scope of the invention set forth in the claims, and that all combinations of the features described in the embodiment are not necessarily essential to achieve the object of the invention.

Figure 1:
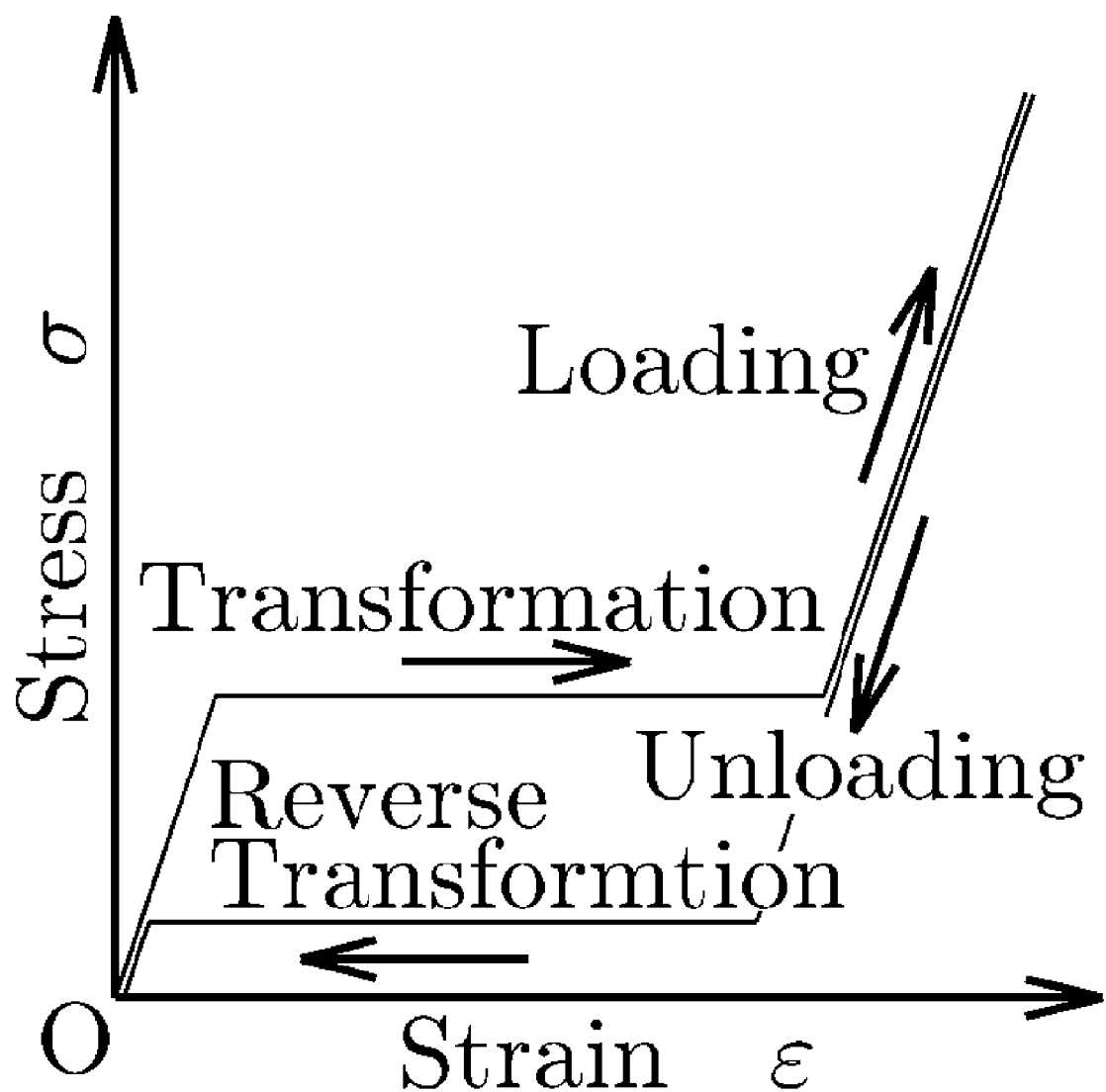
FIG. 1 shows a stress-strain curve of a superelastic material used in an actuator according to the invention.

A superelastic alloy used in an actuator according to the invention has the following deformation characteristic: In a loading process, a large amount of strain is produced in accordance with a phase transformation behavior from austenite to martensite, and in an unloading process, the produced strain is removed and the state before the loading is restored in accordance with reverse transformation from martensite back to austenite. FIG. 1 diagrammatically shows a stress-strain curve illustrating the deformation behavior of the superelastic alloy in the loading and unloading processes. One of the characteristics of the stress-strain curve shown in FIG. 1 is a hysteresis associated with the transformation between the austenite phase and the martensite phase. When the hysteresis allows no reverse transformation to austenite to occur as shown in FIG. 2, however, a large amount of strain is left after the unloading.

Figure 2:
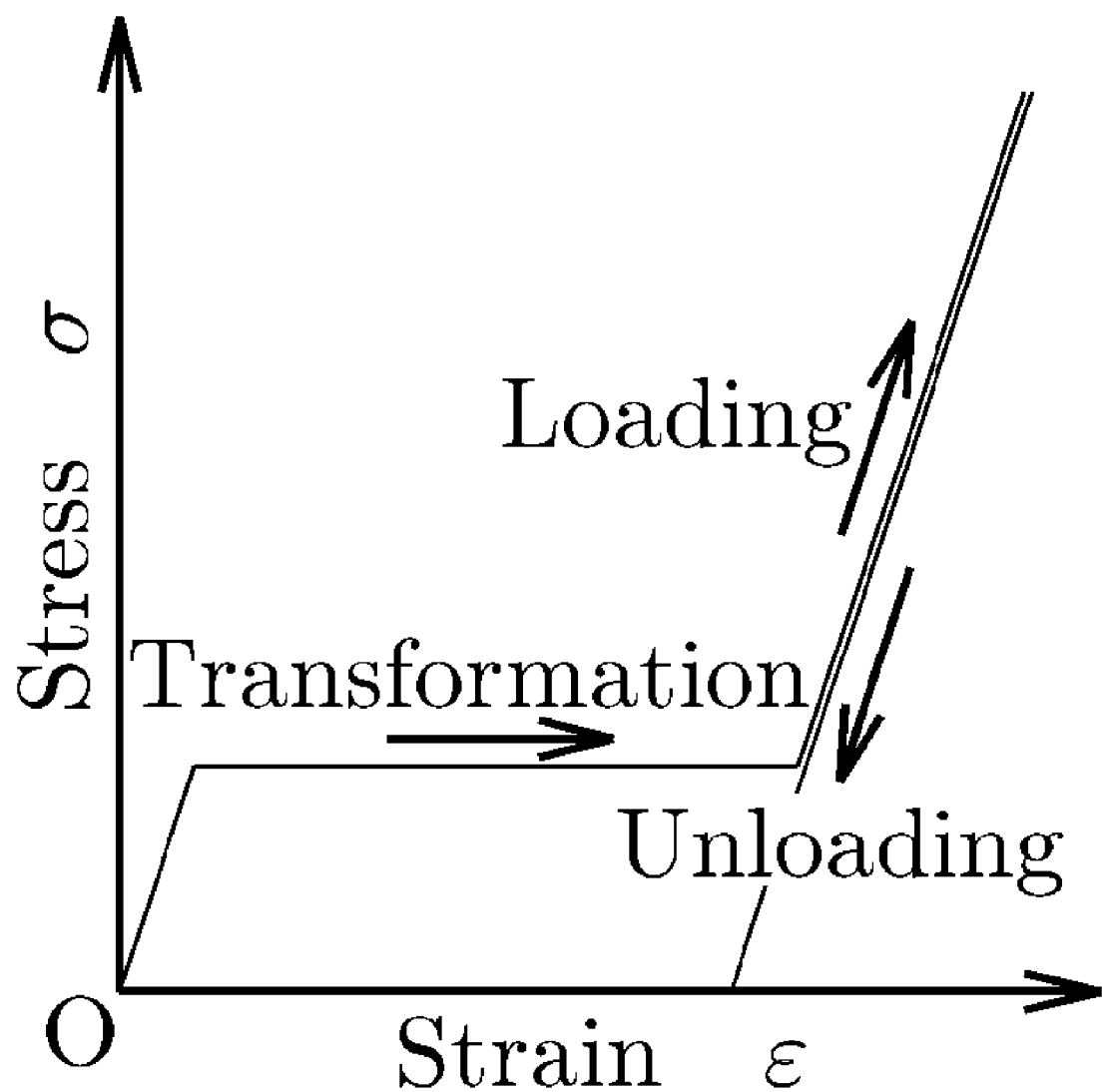
FIG. 2 shows a stress-strain curve of a shape memory alloy as Comparative Example.
Figure 3:
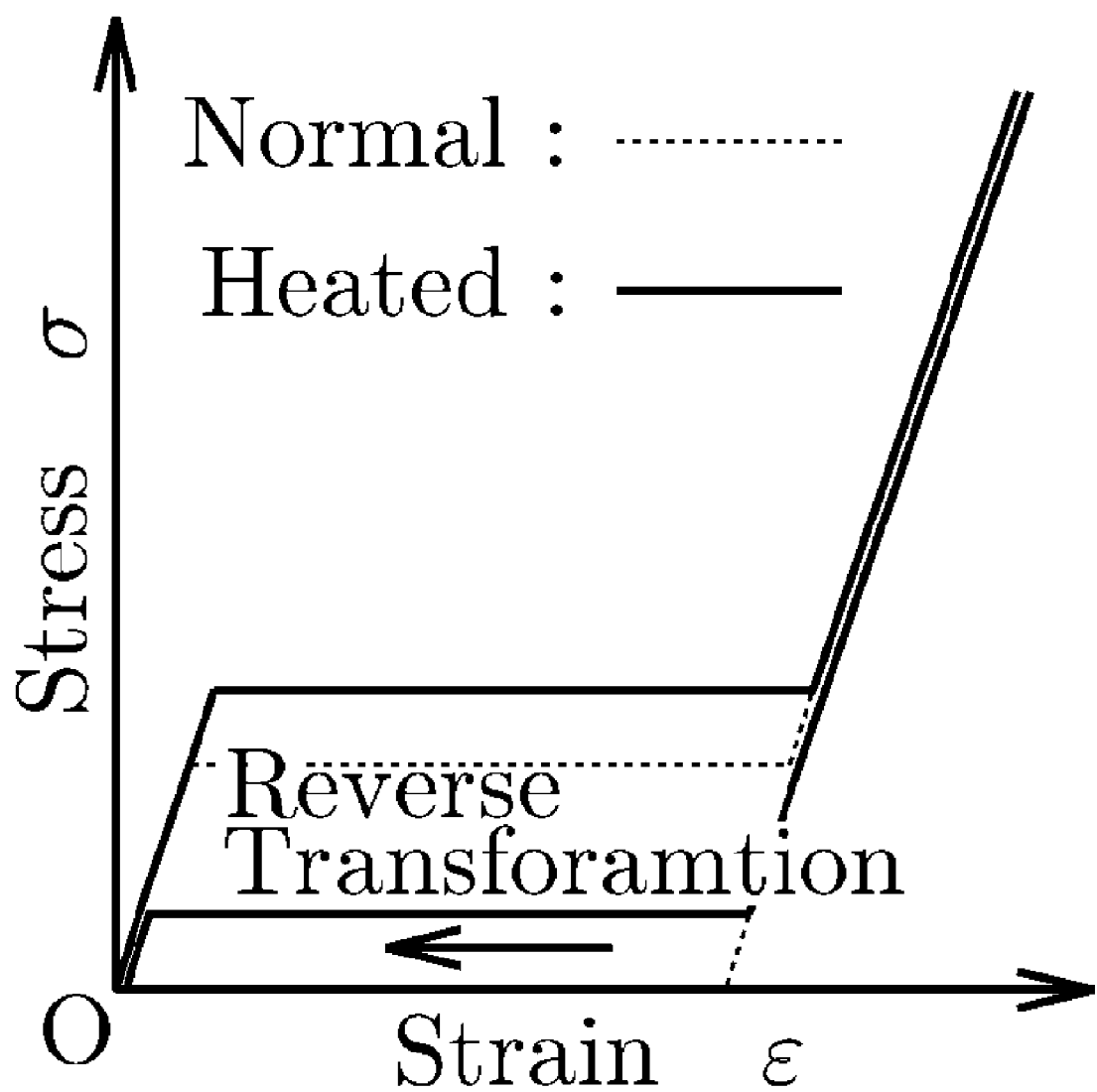
FIG. 3 shows a restoration mechanism of a shape memory alloy.

When heat is applied to the superelastic alloy shown in FIG. 2 having a large amount of strain left after the unloading, and an increase in temperature resulting from the heat application changes the hysteresis of the stress-strain curve, the material to which the heat is applied actively deforms. In particular, when the stress-strain curve is changed to show a hysteresis that allows reverse transformation to austenite to occur as shown in FIG. 3, the large amount of strain left after the unloading is removed and the state before the loading is restored. A shape memory alloy uses the characteristic described above, in which heating removes residual strain and restores an initial state.

Figure 4:
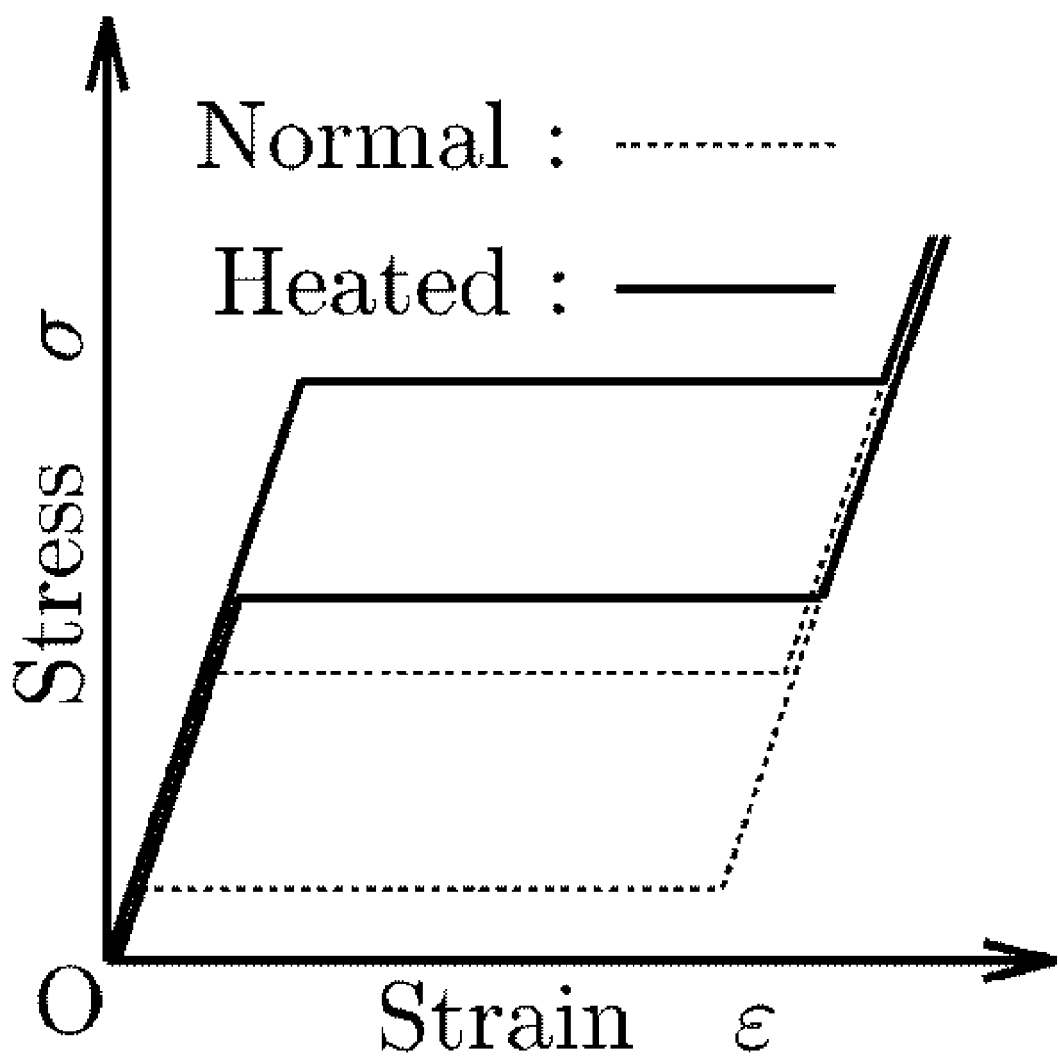
FIG. 4 shows a change in the stress-strain curve of a superelastic material resulting from heat applied thereto.

The superelastic behavior shown in FIG. 1 and the shape memory behavior shown in FIG. 2 are similar to each other, but they are different deformation behaviors in terms of the magnitude of stress at which the transformation between the austenite phase and the martensite phase occurs. The behavior of a shape memory alloy in which residual strain is removed and an initial state is restored can be explained by the fact that heating changes the stress-strain curve as shown in FIG. 3. If the stress-strain curve of a superelastic alloy changes in a similar manner, active deformation can also be observed in the course of the change. Assume now that a heated superelastic alloy has a stress-strain curve that changes as shown in FIG. 4 as in the case of a shape memory alloy, and consider a method for evaluating active deformation that may occur based on the change.

Figure 5:
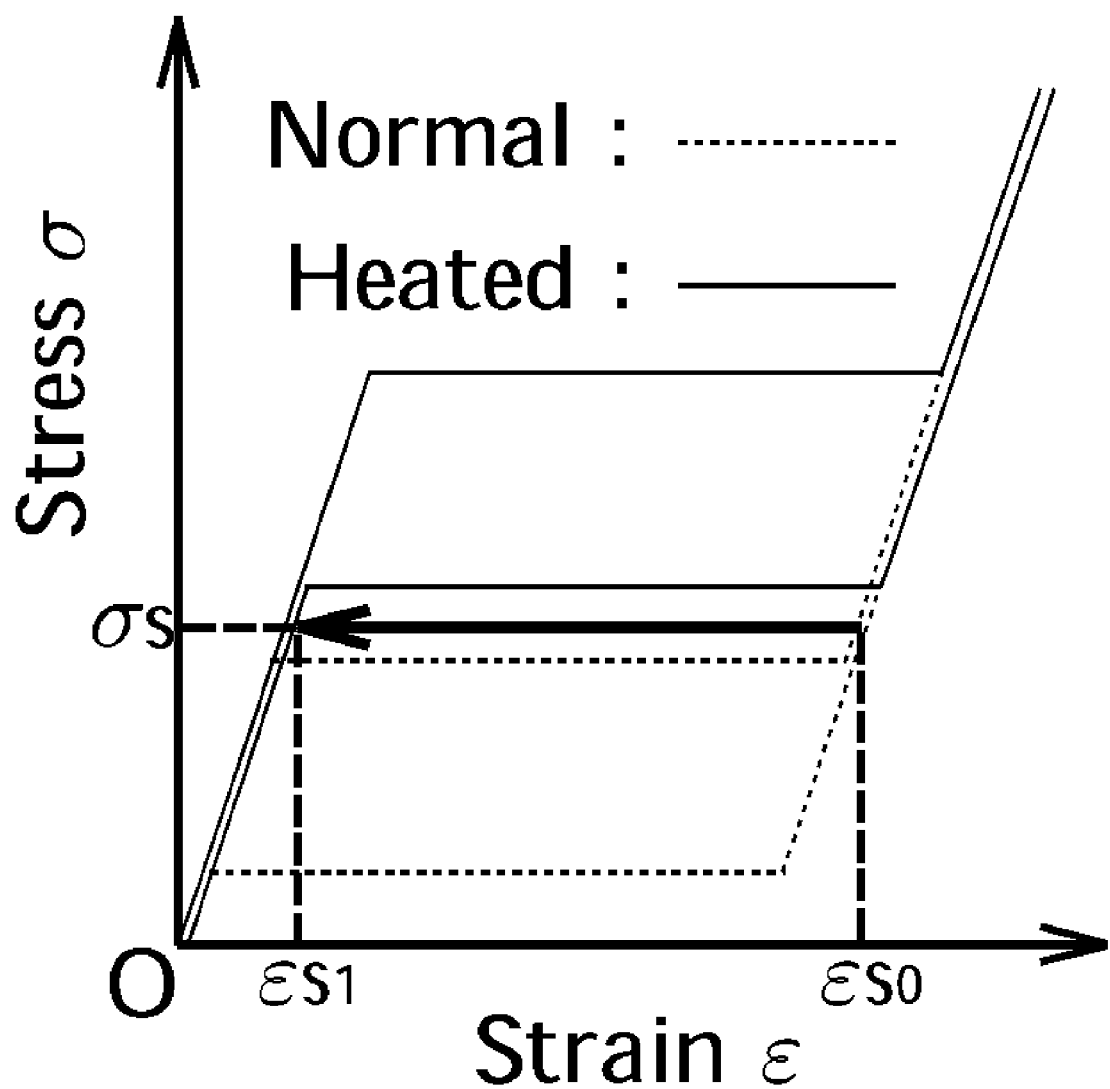
FIG. 5 shows a mechanism according to which a superelastic material shrinks under fixed stress.

Consider a case where a superelastic alloy showing the deformation behavior expressed by the stress-strain curve shown in FIG. 1 is provided and stress $\sigma s$ is induced in the superelastic alloy to a point where phase transformation to martensite occurs as shown in FIG. 5 and the stress $\sigma s$ remains unchanged at a fixed value even when the superelastic alloy is heated. Provided that the heating changes the stress-strain curve to that shown in FIG. 4, strain $\epsilon s_0$ induced by the stress $\sigma s$ before the heating changes to strain $\epsilon s_1$ corresponding to the stress $\sigma s$ induced in advance. The superelastic alloy therefore shows a deformation behavior in which the strain $\epsilon s_0$ decreases to the strain $\epsilon s_1$ when the superelastic alloy is heated under the condition that the stress $\sigma s$ is induced to the point where the phase transformation to martensite occurs and then maintained.

Figure 6:
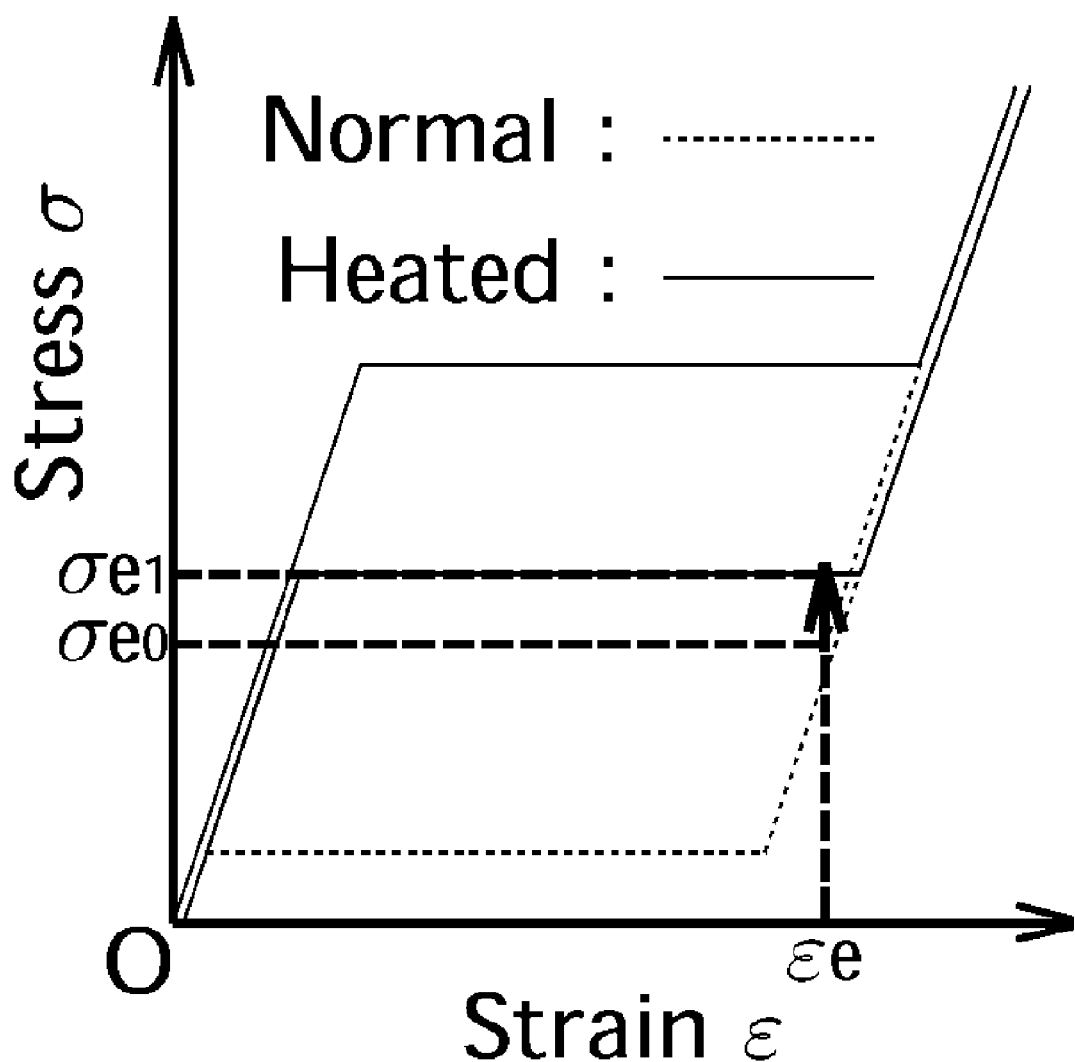
FIG. 6 shows a mechanism according to which the magnitude of stress of a superelastic material increases under fixed strain.

Consider next a case shown in FIG. 6 where strain $\epsilon e$ is induced in the superelastic alloy to the point where the phase transformation to martensite occurs and the strain $\epsilon e$ remains unchanged at a fixed value even when the superelastic alloy is heated. In this process, stress $\sigma e_0$ induced by the prestrain $\epsilon e$ before the heating changes to stress $\sigma e_1$ in accordance with the change in the stress-strain curve shown in FIG. 4 when the heating causes phase reverse transformation to austenite. Therefore, it is believed that the stress in the superelastic alloy changes from $\sigma e_0$ to $\sigma e_1$ under the condition that the prestrain $\epsilon e$ is induced to the point where the phase transformation to martensite occurs and then maintained and when the superelastic alloy is further heated to the point where the phase reverse transformation to austenite occurs.

In view of the above discussion, it is believed that under the condition that stress or strain is induced in advance in the superelastic alloy to the point where the phase transformation to martensite occurs and when the superelastic alloy is further heated to the point where the phase reverse transformation to austenite occurs, the superelastic alloy shows active deformation. To ascertain the above discussion, the inventor has observed the behavior of active deformation of a superelastic wire heated under the condition that prestress is fixed, and a description of the observation will be made below.

Figure 7:
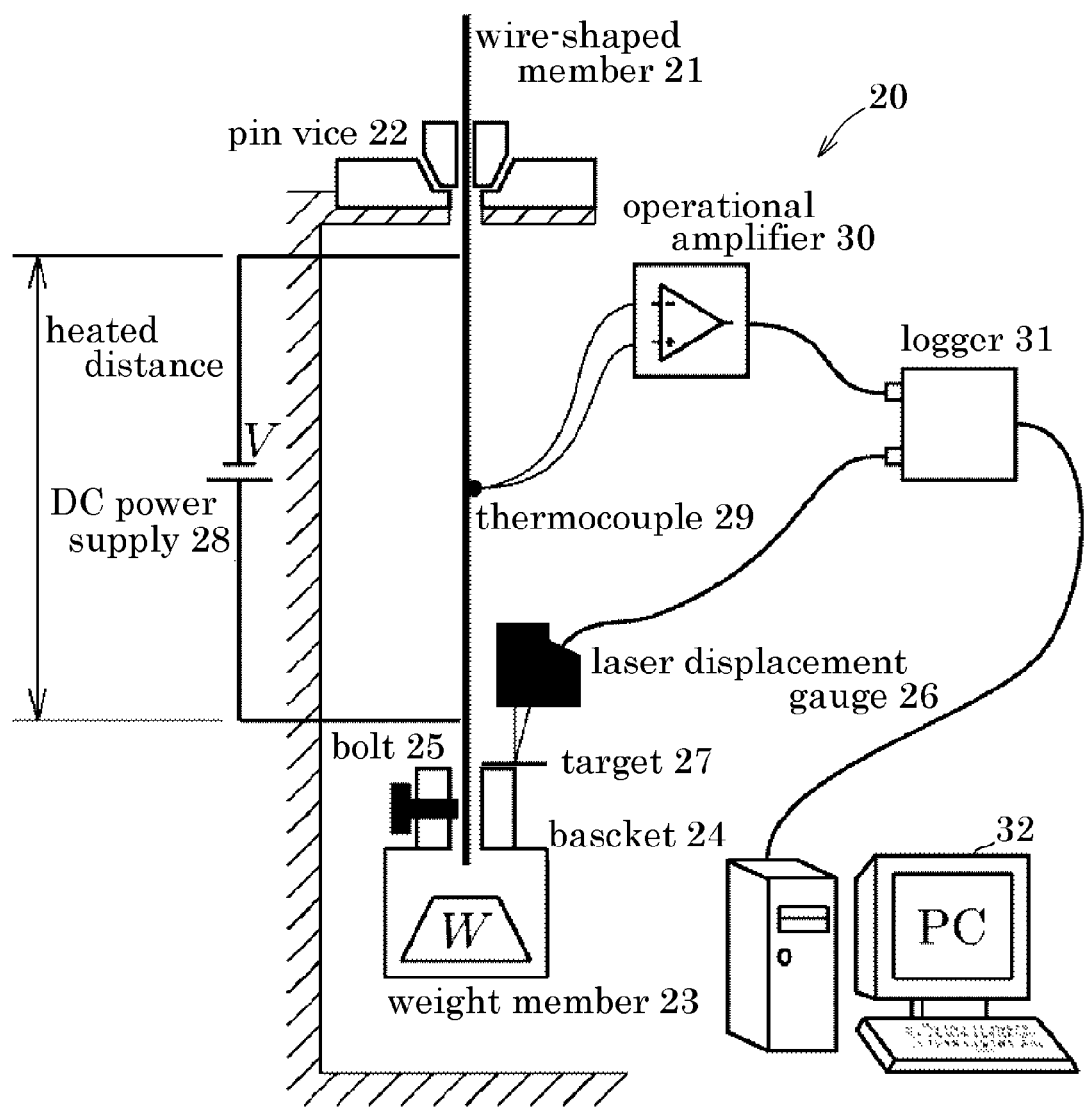
FIG. 7 shows an apparatus that measures a temperature-strain curve of a superelastic material under fixed prestress.

An apparatus shown in FIG. 7 is used to place a wire made of a superelastic alloy provided under the condition that prestrain is fixed, and active deformation of the superelastic alloy that occurs when the wire is heated is observed. In the apparatus 20, the upper end of a wire-like member 21, which is a specimen and oriented in the vertical direction, is fixed by a pin vice 22, and the lower end of the wire-like member 21 is fixed by an upper portion of a basket 24, which accommodates a weight member 23, with a bolt 25. The wire-like member 21 is a superelastic alloy wire (manufactured by NILACO Corporation, Product No. 947365, wire diameter: 0.30 mm). The superelastic alloy wire is made of a Ti—Ni-based alloy. The prestress condition is changed by changing the weight W of the weight member 23 accommodated in the basket 24. A target 27 made of Kent paper is further provided on the upper portion of the basket 24. The target 27 is used to measure elongation of the wire-like member 21 with a laser displacement gauge (manufactured by KEYENCE CORPORATION, Product No. LB-02 (resolution: 2 μm)) 26. The wire-like member 21 is heated by using a DC power supply (manufactured by TAKASAGO LTD., Product No. KX-210L (output voltage: 60 V, output current: 14 A)) 28 to conduct current through the wire-like member 21 along a predetermined heated distance with an electrical clip coated with gold.

The heated distance is set at 250 mm in the present example. The temperature of the wire-like member 21 is measured with a K-type thermocouple (wire diameter: 0.2 mm, sphere diameter: about 0.6 mm) 29 that is in point contact with the wire-like member 21 at right angles at the center of the heated distance. Kent paper or a paper tape having heat capacity smaller than those of metal and resin materials is also used in the temperature measurement in order to reduce the influence on temperature change. The measured temperatures of the wire-like member 21 along with the measured elongation of the specimen are acquired via an amplification circuit using an operational amplifier 30 by a logger (manufactured by Pico Technology (England), Product No. PicoScape 3224 (12 bits, 2 channels, 20 MHz)) 31, and the temperature and elongation data are recorded by a personal computer 32.

In experiments, the temperature of the wire-like member in electrical heating and cooling processes for each prestress condition is measured, and the deformation behavior is evaluated based on the temperature and elongation measurements. Table 1 shows conditions under which the specimen is heated. The voltage values V shown in Table 1, which are set in the DC power supply 28, are set at large values when prestress is large in view of the fact that the period required to reach a predetermined temperature is relatively long when prestress is large as compared with a short period for small prestress. The difference in the period between large prestress and small prestress conceivably results from the following difference in the tissue of the specimen: When prestress is small, the tissue shows an austenite phase having high resistivity, whereas when prestress is large, the tissue shows a martensite phase having low resistivity. The predetermined temperature is set at 46° C., and the DC power supply 28 stops supplying the voltage after it is checked based on data from the thermocouple that the temperature has reached the predetermined temperature. The deformation behavior of the wire-like member 21 is observed in the following process including a self-cooling process. In the experiments, the room temperature was about 21° C., the heating period was set at a value ranging from about 15 to 30 seconds, and the period required for cooling was about 120 seconds.

TABLE 1

| Weight W | Power Supply V |
|---|---|
| 10N (21 kPa), 20N (43 kPa), 30N (64 kPa), 40N (85 kPa) | 3.0 V |
| 50N (105 kPa), 61N (129 kPa) | 4.0 V |

Figure 8:
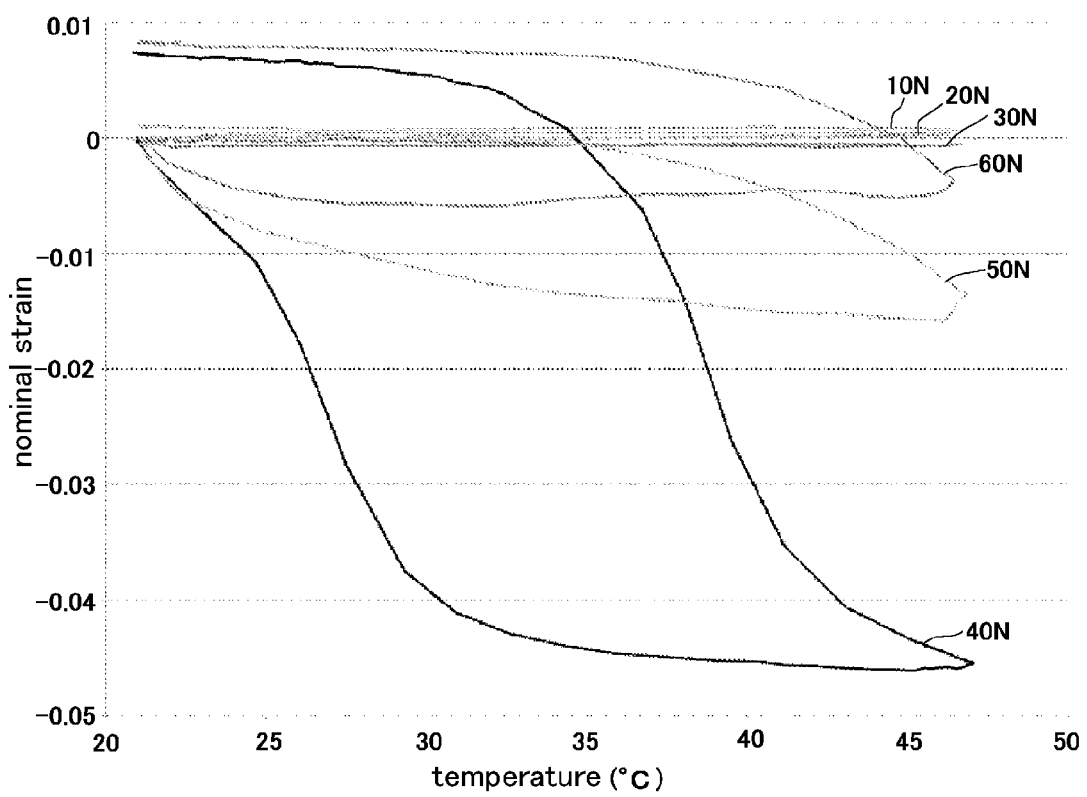
FIG. 8 shows a temperature-strain curve measured with the apparatus shown in FIG. 7.

In the process of heating and cooling the superelastic wire under the experimental conditions described above, a history of the temperature and elongation of the superelastic wire for each prestress is shown in FIG. 8. In particular, the vertical axis represents nominal strain induced by prestress. FIG. 8 shows that slight elongation resulting from heating is observed when the prestress is small, whereas shrinkage occurs immediately after the heating starts when the prestress is 40 N and the amount of shrinkage reaches a nominal strain of −0.045 when the heating temperature reaches 35° C. The amount of shrinkage does not greatly increase even when the heating temperature reaches 45° C. and starts returning to an initial value immediately after the voltage supply is terminated and the cooling process starts.

Further, when the prestress is 50 N, the shrinkage occurs immediately after the heating starts as in the case of the prestress of 40 N, but the amount of shrinkage is up to a nominal strain of about −0.015, which is smaller than the amount of shrinkage for the prestress of 40 N. In the cooling process, it is observed that the shrinkage starts returning to an initial state immediately after the cooling starts, as in the case of the prestress of 40 N. When the prestress is 60 N, the wire starts shrinking immediately after the heating starts, but the change in the amount of shrinkage is smaller than those observed when the prestress is 40 or 50 N, whereas in the cooling process, it is observed that the shrinkage also starts returning to an initial state immediately after the cooling starts. In the experiments under the conditions that the prestress ranges from 40 to 60N, the final amounts of strain differ from each other, but the experiments show no qualitative result on the difference in the final amount of strain.

The results described above show that the superelastic wire under prestress deforms when heated in such a way that elongation resulting from thermal strain, which is typically seen in metal, is observed when the prestress is small, whereas a large amount of shrinkage results from the heating when the prestress is large. However, from the fact that the amount of shrinkage resulting from the heating decreases when the prestress increases in some cases, it is believed that the relationship between the prestress condition and the amount of shrinkage resulting from the heating is complicated.

Based on the mechanism of the active deformation described above, the characteristics of the superelastic wire used in an actuator are as follows: The superelastic wire under a tensile force works as a two-way actuator that shrinks when heated whereas stretching when cooled and used as a two-way actuator formed of a wire or any other wire-like member because reverse transformation occurs under a tensile force. Further, the inherent superelastic effect provides the actuator with flexibility in addition to the characteristics described above. Moreover, since a superelastic material is a metal-based material, a greater force can be produced than a polymer-based or ion-based actuator.

Figure 9:
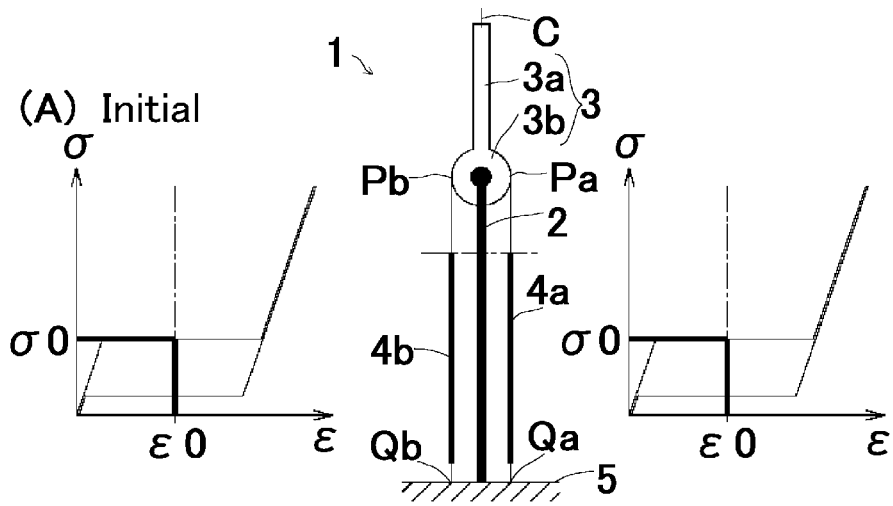
FIGS. 9(A), 9(B), and 9(C) describe first operation of an actuator according to an embodiment of the invention.
Figure 9:
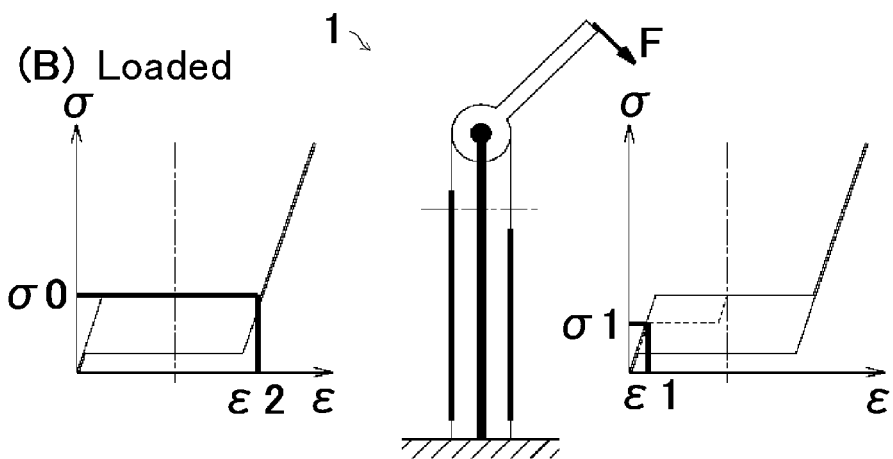
Figure 9:
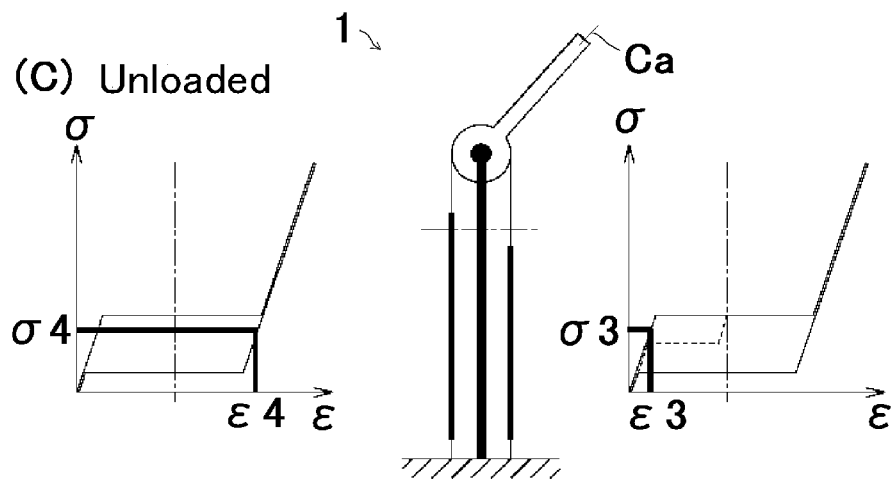

An actuator 1 according to the present embodiment includes a column 2, a level 3 as a movable member, and wires 4a and 4b as a pair of wire-like members, as shown in FIG. 9. The column 2 is made of a metal material, a plastic material, or any other suitable material and stands on a floor surface 5. The lever 3 is made of a metal material, a plastic material, or any other suitable material and includes a rod-shaped operation section 3a and a disk-shaped rotating section 3b provided at an end of the operation section 3a and integrated therewith. The lever 3, which is so attached to the column 2 that the center of the rotating section 3b is rotatable around the upper end of the column 2, is rotatable in two directions, clockwise as one direction and counterclockwise as the other direction.

Figure 10:
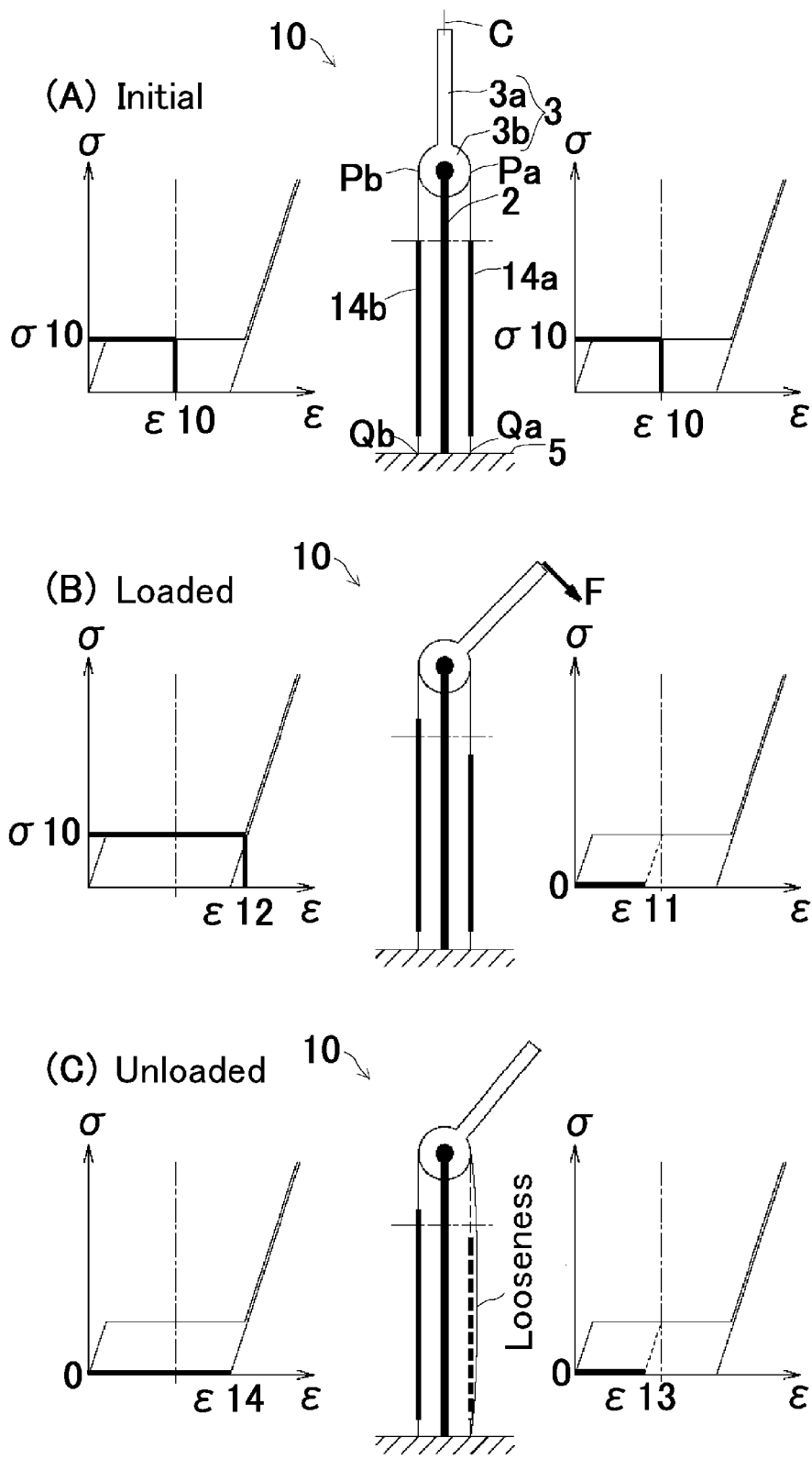
FIGS. 10(A), 10(B), and 10(C) describe the first operation of an actuator according to Comparative Example.

The pair of wires 4a and 4b are made of a Ti—Ni superelastic alloy and so attached to the lever 3 that the two wires extend in the two respective directions and the same tensile force is applied thereto. That is, the wire 4a extending in the one direction has one end fixed to a point Pa on the right in FIG. 9 along the circumference of the rotating section 3b and the other end fixed to a point Qa on the floor surface 5 vertically below the point Pa, and the wire 4b extending in the other direction has one end fixed to a point Pb on the left in FIG. 9 along the circumference of the rotating section 3b and the other end fixed to a point Qb on the floor surface 5 vertically below the point Pb. An actuator 10 according to Comparative Example has the same configuration as that of the actuator 1 according to the present embodiment shown in FIG. 9 except that a pair of wires 14a and 14b are made of a shape memory alloy, as shown in FIG. 10. The same components have the same reference numerals, and no description thereof will be made in detail.

A description will be made of first operation of the thus configured actuator 1 according to the present embodiment. In an initial state, it is assumed that the pair of wires 4a and 4b are both under tensile stress $\sigma_0$ and hence strain $\epsilon_0$ is induced in both the wires, as shown in FIG. 9(A). That is, it is assumed that within the range over which the strain $\epsilon$ changes under the fixed tensile stress $\sigma_0$, the strain $\epsilon_0$ having a roughly intermediate value is induced. At this point, the lever 3 is stationary in a neutral position C where the operation section 3a is oriented vertically upward.

When a clockwise load F is applied to the tip of the operation section 3a of the lever 3, the rotating section 3b of the lever 3 rotates clockwise, resulting in shrinkage of the wire 4a extending in the one direction and elongation of the wire 4b extending in the other direction, as shown in FIG. 9(B). As a result, the strain $\epsilon$ of the wire 4a extending in the one direction changes to strain $\epsilon_1$, which is smaller than the initial strain $\epsilon_0$, and the tensile stress $\sigma$ of the wire 4a extending in the one direction therefore changes to tensile stress $\sigma_1$, which is smaller than the initial tensile stress $\sigma_0$. That is, the tensile stress $\sigma$ changes to the tensile stress $\sigma_1$, which corresponds to the strain $\epsilon_1$, within the range over which the strain $\epsilon$ increases or decreases as the tensile stress $\sigma$ increases or decreases.

On the other hand, it is assumed that the strain $\epsilon$ of the wire 4b extending in the other direction changes to strain $\epsilon 2$, which is greater than the initial strain $\epsilon_0$, but that the tensile stress $\sigma$ of the wire 4b extending in the other direction remains at the same value $\sigma_0$, which is the initial tensile stress $\sigma_0$. That is, it is assumed that maximum strain $\epsilon_2$ within the range over which the strain $\epsilon$ changes under the fixed tensile stress $\sigma_0$ is induced. At this point, the difference between the tensile stress $\sigma_0$ and the tensile stress $\sigma_1$ corresponds to stress induced by the load F.

When the load F applied to the tip of the operation section 3a of the lever 3 is removed, the wire 4a extending in the one direction elongates, whereas the wire 4b extending in the other direction shrinks, resulting in counterclockwise rotation of the rotating section 3b of the lever 3, as shown in FIG. 9(C). As a result, the strain $\epsilon$ of the wire 4a extending in the one direction changes to strain $\epsilon_3$, which is greater than the strain $\epsilon_1$ at the time of loading, and the tensile stress a of the wire 4a extending in the one direction changes to tensile stress $\sigma_3$, which is greater than the tensile stress $\sigma_1$ at the time of loading. That is, the tensile stress $\sigma$ changes to the tensile stress $\sigma_3$, which corresponds to the strain $\epsilon_3$, within the range over which the strains increases or decreases as the tensile stress $\sigma$ increases or decreases.

On the other hand, the strains of the wire 4b extending in the other direction changes to strain $\epsilon_4$, which is smaller than the strain $\epsilon_2$ at the time of loading, and the tensile stress $\sigma$ of the wire 4b extending in the other direction therefore changes to tensile stress $\sigma_4$, which is smaller than the tensile stress $\sigma_0$ at the time of loading. That is, the tensile stress $\sigma$ changes to the tensile stress $\sigma_4$, which corresponds to the strain $\epsilon_4$, within the range over which the strain $\epsilon$ increases or decreases as the tensile stress $\sigma$ increases or decreases. At this point, the tensile stress $\sigma_3$ and the tensile stress $\sigma_4$ are equal to each other.

As a result, the operation section 3a of the lever 3 does not return to the neutral position C but stops in the course thereto in the one direction and is stationary in a predetermined position Ca. To move the operation section 3a of the lever 3 from the predetermined position Ca located along the one direction back to the neutral position C, a counterclockwise load may be applied to the operation section 3a of the lever 3 and then the load may be removed. As described above, the wires 4a and 4b made of the superelastic alloy can be used as part of the actuator 1, which is required to be repeatedly driven by the loading and unloading operation.

A description will next be made of the first operation of the actuator 10 according to the Comparative Example. In an initial state, it is assumed that the pair of wires 14a and 14b are both under tensile stress $\sigma_{10}$ and hence strain $\epsilon_{10}$ is induced in both the wires, as shown in FIG. 10(A). That is, it is assumed that within the range over which the strain $\epsilon$ changes under the fixed tensile stress $\sigma_{10}$, the strain $\epsilon_{10}$ having a roughly intermediate value is induced. At this point, the lever 3 is stationary in the neutral position C where the operation section 3a is oriented vertically upward.

When a clockwise load F is applied to the tip of the operation section 3a of the lever 3, the rotating section 3b of the lever 3 rotates clockwise, resulting in shrinkage of the wire 14a extending in the one direction and elongation of the wire 14b extending in the other direction, as shown in FIG. 10(B). As a result, the strain $\epsilon$ of the wire 14a extending in the one direction changes to strain $\epsilon_{11}$, which is smaller than the initial strain $\epsilon_{10}$, and the tensile stress $\sigma$ of the wire 14a extending in the one direction therefore changes to roughly zero. That is, the small strain $\epsilon_{11}$ within the range over which the strain $\epsilon$ changes under the tensile stress $\sigma$ of roughly zero is induced. On the other hand, the strains of the wire 14b extending in the other direction changes to strain $\epsilon_{12}$, which is greater than the initial strain $\epsilon_{10}$, but the tensile stress $\sigma$ of the wire 14b extending in the other direction remains at the same value $\sigma_{10}$, which is the initial tensile stress $\sigma_{10}$. That is, maximum strain $\epsilon_{12}$ within the range over which the strain $\epsilon$ changes under the fixed tensile stress $\sigma_{10}$ is induced.

When the load F applied to the tip of the operation section 3a of the lever 3 is removed, the wire 14a extending in the one direction elongates, whereas the wire 14b extending in the other direction shrinks, resulting in counterclockwise rotation of the rotating section 3b of the lever 3, as shown in FIG. 10(C). As a result, the strain $\epsilon$ of the wire 14a extending in the one direction changes to strain $\epsilon_{13}$, which is greater than the strain $\epsilon_{11}$ at the time of loading, but the tensile stress $\sigma$ of the wire 14a extending in the one direction remains at roughly zero, which is equal to the tensile stress at the time of loading. That is, the tensile stress $\sigma$ changes to the tensile stress of roughly zero, which corresponds to the strain $\epsilon_{13}$, within the range over which the strain $\epsilon$ changes under the tensile stress of roughly zero.

On the other hand, the strain $\epsilon$ of the wire 14b extending in the other direction changes to strain $\epsilon_{14}$, which is smaller than the strain $\epsilon_{12}$ at the time of loading, and the magnitude of tensile stress of the wire 14b extending in the other direction therefore changes to roughly zero. That is, the tensile stress $\sigma$ changes to the tensile stress of roughly zero, which corresponds to the strain $\epsilon_{14}$, within the range over which the strain $\epsilon$ changes under the tensile stress of roughly zero. As a result, the wire 14a extending in the one direction loosens. The wires 14a and 14b made of a shape memory alloy cannot be used in principle as part of the actuator 10, which is required to be repeatedly driven by the loading and unloading operation.

Figure 11:
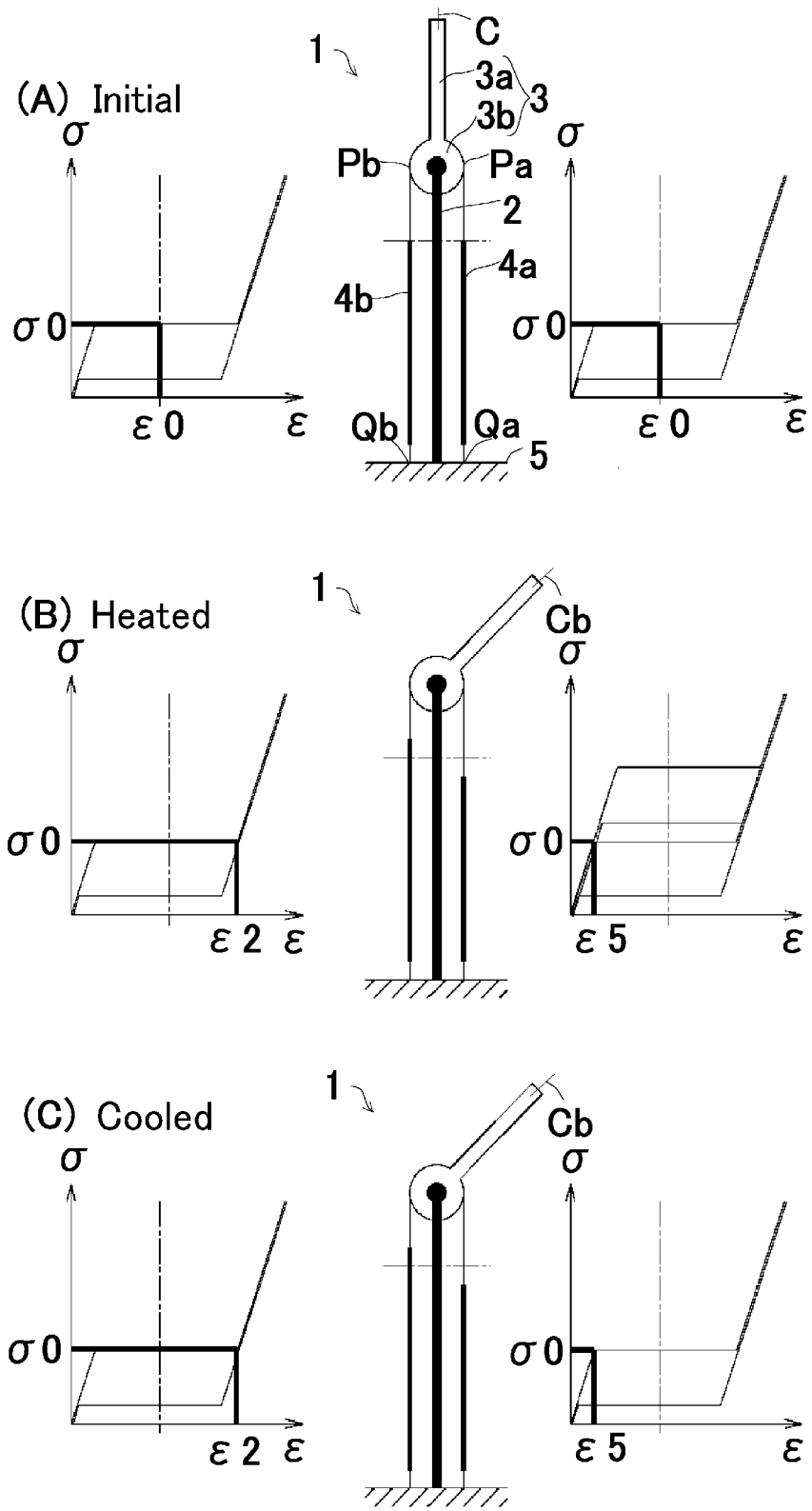
FIGS. 11(A), 11(B), and 11(C) describe second operation of the actuator according to the embodiment of the invention.

A description will next be made of second operation of the actuator 1 according to the present embodiment. In the initial state, it is assumed that the pair of wires 4a and 4b are both under the tensile stress $\sigma_0$ and hence the strain $\epsilon_0$ is induced in both the wires, as shown in FIG. 11(A). That is, it is assumed that within the range over which the strain $\epsilon$ changes under the fixed tensile stress $\sigma_0$, the strain $\epsilon_0$ having a roughly intermediate value is induced. At this point, the lever 3 is stationary in the neutral position C, where the operation section 3a is oriented vertically upward.

When the wire 4a extending in the one direction is heated, the hysteresis curve of the wire 4a extending in the one direction is shifted upward, which changes the strain $\epsilon$ of the wire 4a extending in the one direction to strain $\epsilon_5$, which is smaller than the initial strain $\epsilon_0$, while the tensile stress $\sigma$ of the wire 4a extending in the one direction remains at the same value $\sigma_0$, which is the initial tensile stress $\sigma_0$, as shown in FIG. 11(B). That is, the wire 4a extending in the one direction shrinks still under the tensile stress $\sigma_0$. On the other hand, the shrinkage of the wire 4a extending in the one direction causes the wire 4b extending in the other direction to be pulled. The strains of the wire 4b extending in the other direction therefore changes to the strain $\epsilon_2$, which is greater than the initial strain $\epsilon_0$, but the tensile stress σ of the wire 4b extending in the other direction remains at the same value $\sigma_0$, which is the initial tensile stress $\sigma_0$. That is, the maximum strain $\epsilon_2$ within the range over which the strain $\epsilon$ changes under the fixed tensile stress $\sigma_0$ is induced. Since the wire 4a extending in the one direction shrinks and the wire 4b extending in the other direction elongates, the rotating section 3b of the lever 3 rotates clockwise, and the tip of the operation section 3a of the lever 3 also rotates clockwise.

When the wire 4a extending in the one direction is cooled, the hysteresis curve of the wire 4a extending in the one direction is shifted downward, but the pair of wires 4a and 4b maintain their states, which causes the rotating section 3b of the lever 3 to maintain its clockwise rotated state, and the operation section 3a of the lever 3 is stationary in a predetermined position Cb along the one direction, as shown in FIG. 11(C). To move the operation section 3a of the lever 3 from the predetermined position Cb located along the one direction back to the neutral position C, the wire 4b extending in the other direction may be heated.

As described above, the wires 4a and 4b made of the superelastic alloy can be in principle used as part of the actuator 1, which is required to be repeatedly driven by the heating and cooling operation. The actuator 10 according to Comparative Example operates in the same manner as the actuator 1 when operating in the second operation mode described above, whereby the wires 14a and 14b made of a shape memory alloy can be in principle used as part of the actuator 10, which is required to be repeatedly driven by the heating and cooling operation. It is, however, noted that the wires 4a and 4b made of the superelastic alloy are characterized by a low heating temperature, excellent durability, and no necessity of composition adjustment, whereas the wires 14a and 14b made of a shape memory alloy have disadvantages of a high heating temperature, poor durability, and complicated manufacturing method and necessity of composition adjustment.

The superelastic alloy can, for example, be a Ti—Ni-based alloy, a Cu—Zn—Al alloy, an Fe—Mn—Si alloy, and an Fe—Ni—Co alloy.

The structure of the actuator is not limited to the structure described above. Other examples of the structure of the actuator include a movable object and a pair of wires running on both sides thereof so configured that the movable object makes a linear reciprocating motion, a column and a pair of wires running on both sides of a front-side end portion of the column so configured that a base-side end portion of the column is fixed to a floor surface and the front-side end portion of the column is bent, and a round rod and a pair of wires running on both circumferential sides of a front-side end portion of the round rod so configured that a base-side end portion of the round rod is fixed to a wall surface and the front-side end portion of the round rod is twisted. Still alternatively, the actuator may be formed of a superelastic wire extending in the one direction and a spring or any other suitable component extending in the other direction.

The heating temperature of a superelastic alloy preferably ranges from 0 to 300° C. When the heating temperature is higher than or equal to 0° C., the superelastic alloy can advantageously be water cooled. When the heating temperature is lower than or equal to 300° C., the superelastic alloy will not advantageously be oxidized in the atmosphere.

Reference Signs List
1, 10: Actuator, 2: Column, 3: Lever, 3a: Operation section, 3b: Rotating section, 4a, 4b, 14a, 14b: Wire, 5: Floor surface

The invention claimed is:

1. An actuator including a wire-like member, characterized in that the actuator comprises:
   loading means for loading stress or strain in the wire-like member and heating means for heating the wire-like member,
   the wire-like member is formed of a superelastic alloy member,
   when the superelastic alloy member is maintained at a temperature under a no-heating condition or at a temperature after heating, a stress-strain curve of the superelastic alloy member forms a hysteresis curve,
   the hysteresis curve in a stress increase process experiences a steep decrease in the gradient of the curve and the absolute value of the change rate of the gradient maximized at a first maximum change rate point, and the hysteresis curve in a stress decrease process experiences a steep decrease in the gradient of the curve and the absolute value of the change rate of the gradient maximized at a second maximum change rate point,
   the loading means is used to load predetermined stress or strain in the superelastic alloy member under the no-heating condition,
   the heating means is used, while the loading is maintained, to heat the superelastic alloy member to a first predetermined temperature to shrink the superelastic alloy member and then cool the superelastic alloy member to a second predetermined temperature to elongate the superelastic alloy member,
   the predetermined stress or strain is greater than stress or strain at the first maximum change rate point of the hysteresis curve induced when the superelastic alloy member is maintained at the temperature under the non-heating condition,
   at the first predetermined temperature, at which the hysteresis curve is shifted upward, the predetermined stress or strain becomes smaller than stress or strain at the second maximum change rate point induced when the first predetermined temperature is maintained, and
   at the second predetermined temperature, at which the hysteresis curve is shifted downward, the predetermined stress or strain becomes greater than stress or strain at the first maximum change rate point of the hysteresis curve induced when the second predetermined temperature is maintained.

2. The actuator according to claim 1, wherein the superelastic alloy member is made of a Ti—Ni alloy.

3. The actuator according to claim 1, wherein the superelastic alloy member is heated at temperatures ranging from 21 to 47° C.

4. An actuator including a plurality of wire-like superelastic alloy members, characterized in that the actuator comprises:
   heating means for heating the plurality of superelastic alloy members,
   the plurality of superelastic alloy members pull each other via a movable member or a movable section of a fixed member,
   when each of the superelastic alloy members is maintained at a temperature under a non-heating condition or at a temperature after heating, a stress-strain curve of the superelastic alloy member forms a hysteresis curve, the hysteresis curve in a stress increase process experiences a steep decrease in the gradient of the curve and the absolute value of the change rate of the gradient maximized at a first maximum change rate point, and the hysteresis curve in a stress decrease process experiences a steep decrease in the gradient of the curve and the absolute value of the change rate of the gradient maximized at a second maximum change rate point, after predetermined stress or strain is loaded in at least one of the superelastic alloy members under the no-heating condition, and when the loading is maintained, the superelastic alloy member shrinks when heated by the heating means to a first predetermined temperature and then elongates when cooled to a second predetermined temperature, the predetermined stress or strain is greater than stress or strain at the first maximum change rate point of the hysteresis curve induced when the temperature under the non-heating condition is maintained, at the first predetermined temperature, at which the hysteresis curve is shifted upward, the predetermined stress or strain becomes smaller than stress or strain at the second maximum change rate point of the hysteresis curve induced when the first predetermined temperature is maintained, and at the second predetermined temperature, at which the hysteresis curve is shifted downward, the predetermined stress or strain becomes greater than stress or strain at the first maximum change rate point of the hysteresis curve induced when the second predetermined temperature is maintained.

5. The actuator according to claim 4, wherein the superelastic alloy members are made of a Ti—Ni alloy.

6. The actuator according to claim 4, wherein the superelastic alloy members are heated at temperatures ranging from 21 to 47° C.

7. An actuator including two wire-like superelastic alloy members, characterized in that the actuator comprises:

heating means for heating the two superelastic alloy members, the two superelastic alloy members pull each other via a movable member, when each of the superelastic alloy members is maintained at a temperature under a non-heating condition or at a temperature after heating, a stress-strain curve of the superelastic alloy member forms a hysteresis curve, the hysteresis curve in a stress increase process experiences a steep decrease in the gradient of the curve and the absolute value of the change rate of the gradient maximized at a first maximum change rate point, and the hysteresis curve in a stress decrease process experiences a steep decrease in the gradient of the curve and the absolute value of the change rate of the gradient maximized at a second maximum change rate point, after predetermined stress or strain is loaded in one of the superelastic alloy members under the no-heating condition, and when the loading is maintained, the superelastic alloy member shrinks when heated by the heating means to a first predetermined temperature and then elongates when cooled to a second predetermined temperature, the predetermined stress or strain is greater than stress or strain at the first maximum change rate point of the hysteresis curve induced when the temperature under the non-heating condition is maintained, at the first predetermined temperature, at which the hysteresis curve is shifted upward, the predetermined stress or strain becomes smaller than stress or strain at the second maximum change rate point of the hysteresis curve induced when the first predetermined temperature is maintained, and at the second predetermined temperature, at which the hysteresis curve is shifted downward, the predetermined stress or strain becomes greater than stress or strain at the first maximum change rate point of the hysteresis curve induced when the second predetermined temperature is maintained.

8. The actuator according to claim 7, wherein the superelastic alloy members are made of a Ti—Ni alloy.

9. The actuator according to claim 7, wherein the superelastic alloy members are heated at temperatures ranging from 21 to 47° C.

10. An actuator including a wire-like member, characterized in that the actuator comprises:

loading means for loading stress or strain in the wire-like member and heating means for heating the wire-like member, the wire-like member is formed of a superelastic alloy member, and the loading means is used to load stress or strain in the superelastic alloy member under a no-heating condition to a point where phase transformation to martensite occurs, and the heating means is used, while the loading is maintained, to heat the superelastic alloy member to a point where phase reverse transformation to austenite occurs to shrink the superelastic alloy member.

11. An actuator including a plurality of wire-like superelastic alloy members, characterized in that the actuator comprises:

heating means for heating the plurality of superelastic alloy members, the plurality of superelastic alloy members pull each other via a movable member or a movable section of a fixed member, and stress or strain is loaded in at least one of the superelastic alloy members under a tensile force and under a no-heating condition to a point where phase transformation to martensite occurs, and the heating means is used, while the loading is maintained, to heat the superelastic alloy member to a point where phase reverse transformation to austenite occurs to shrink the superelastic alloy member.

12. An actuator including two wire-like superelastic alloy members, characterized in that the actuator comprises:

heating means for heating the two superelastic alloy members, the two superelastic alloy members pull each other via a movable member, stress or strain is loaded in one of the superelastic alloy members under a tensile force and under a no-heating condition to a point where phase transformation to martensite occurs, and the heating means is used, while the loading is maintained, to heat the superelastic alloy member to a point where phase reverse transformation to austenite occurs to shrink the superelastic alloy member.

* * * * *